United States Patent [19]

Johnson, Jr.

[11] 4,312,326
[45] Jan. 26, 1982

[54] ELECTRO-MAGNETIC RADIATION REFLECTIVE CONCENTRATOR

[75] Inventor: Alfred L. Johnson, Jr., Manhattan Beach, Calif.

[73] Assignee: LaJet Energy Company, Abilene, Tex.

[21] Appl. No.: 155,016

[22] Filed: May 30, 1980

[51] Int. Cl.³ .......................... F24J 3/02; F28F 9/00
[52] U.S. Cl. .................................. 126/424; 126/438; 126/451; 165/68
[58] Field of Search .............. 126/417, 424, 425, 438, 126/439, 4 50, 451; 165/67, 68; 248/232, 233, 183; 353/3; 250/491

[56] References Cited

U.S. PATENT DOCUMENTS

| | | |
|---|---|---|
| 514,669 | 2/1894 | Allingham . |
| 787,145 | 4/1905 | Brown ................................. 126/438 |
| 811,274 | 1/1906 | Carter . |
| 2,460,482 | 2/1949 | Abbot .................................. 126/438 |
| 2,658,776 | 11/1953 | Wilcox .................................. 287/54 |
| 2,760,482 | 8/1956 | Tarcici ................................. 126/270 |
| 2,770,230 | 11/1956 | Tarcici ................................. 126/270 |
| 2,798,478 | 7/1957 | Tarcici ................................. 126/270 |
| 2,952,189 | 9/1960 | Pajes .................................... 88/73 |
| 2,964,147 | 12/1960 | Fentiman ............................. 189/34 |
| 2,976,968 | 3/1961 | Fentiman ............................. 189/34 |
| 2,987,961 | 6/1961 | Cotton et al. ......................... 88/84 |
| 3,009,391 | 11/1961 | Zagieboyld et al. ................... 88/84 |
| 3,052,228 | 9/1962 | Okuda ................................. 126/271 |
| 3,171,403 | 3/1965 | Drescher ............................. 126/270 |
| 3,200,820 | 8/1965 | Garrett ............................... 126/271 |
| 3,270,478 | 9/1966 | Attwood ............................... 52/648 |
| 3,309,121 | 3/1967 | Fentiman ....................... 287/189.36 |
| 3,323,820 | 6/1967 | Braccini ......................... 287/189.36 |
| 3,364,676 | 1/1968 | Miller .................................. 60/26 |
| 3,443,348 | 5/1969 | Papayoti .............................. 52/299 |
| 3,466,119 | 9/1969 | Francia ............................... 126/438 |
| 3,485,005 | 12/1969 | Kutchai ............................... 52/643 |
| 3,884,217 | 5/1975 | Wartes ................................ 126/270 |
| 3,914,063 | 10/1975 | Papayoti ............................. 403/406 |
| 3,918,233 | 11/1975 | Simpson .............................. 52/747 |
| 3,977,773 | 8/1976 | Hubbard ............................. 350/292 |
| 3,993,528 | 11/1976 | Pauly ................................. 156/245 |
| 4,010,614 | 3/1977 | Arthur ................................ 60/641 |
| 4,033,676 | 7/1977 | Brantley, Jr. et al. ................ 350/295 |
| 4,046,462 | 9/1977 | Fletcher et al. ..................... 350/295 |
| 4,110,009 | 8/1978 | Bunch ................................ 350/292 |
| 4,110,010 | 8/1978 | Hilton ................................ 350/292 |
| 4,111,184 | 9/1978 | Fletcher et al. ..................... 126/425 |
| 4,126,123 | 11/1978 | Hall .................................... 126/271 |
| 4,129,360 | 12/1978 | Deflandre et al. ................... 350/289 |
| 4,137,902 | 2/1979 | Bunch ................................ 126/438 |
| 4,138,994 | 2/1979 | Shipley .............................. 126/438 |
| 4,139,286 | 2/1979 | Hein et al. ........................... 126/438 |
| 4,170,985 | 10/1979 | Authier .............................. 126/424 |
| 4,183,190 | 1/1980 | Bance ................................ 52/648 |
| 4,195,775 | 4/1980 | Pitts .................................. 126/425 |
| 4,211,044 | 7/1980 | Gugliotta et al. .................... 52/200 |
| 4,211,211 | 7/1980 | Toomey et al. ..................... 126/439 |
| 4,235,222 | 11/1980 | Ionescu .............................. 126/438 |
| 4,251,135 | 2/1981 | Stone ................................ 126/438 |
| 4,266,530 | 5/1981 | Steadman ........................... 126/438 |

FOREIGN PATENT DOCUMENTS

| | | |
|---|---|---|
| 2444612 | 4/1976 | Fed. Rep. of Germany . |
| 2643539 | 3/1978 | Fed. Rep. of Germany . |
| 682854 | 6/1930 | France . |
| 581277 | 8/1958 | Italy . |

OTHER PUBLICATIONS

Muirhead, Variable Focal Length Mirrors, Review of Scientific Instruments, vol. 32, No. 2, Feb. 1961, pp. 210-211.

*Primary Examiner*—Daniel J. O'Connor
*Attorney, Agent, or Firm*—Roylance, Abrams, Berdo & Farley

[57] ABSTRACT

A system for concentrating electro-magnetic radiation, such as solar radiation, by means of a plurality of reflectors mounted on a common frame and aimed at a radiation absorber that is rigidly coupled to the frame by an intermediate support. The combined frame, reflectors, absorber and intermediate support are coupled to a cantilever beam by means of a suspension assembly located between the absorber and the reflectors. This suspension is at the center of gravity of the combined frame, reflectors, absorber and intermediate support. The cantilever beam is coupled at one end to a main support and at the other to the suspension assembly. This suspension assembly allows the combined frame, reflectors, absorber and intermediate support to pivot relative to the beam about two perpendicular axes.

12 Claims, 15 Drawing Figures

ELECTRO-MAGNETIC RADIATION REFLECTIVE CONCENTRATOR

RELATED APPLICATIONS

The following applications, which are prior filed and commonly owned, are hereby incorporated by reference:

1. U.S. patent application Ser. No. 149,587 entitled CURVED REFLECTOR WITH ADJUSTABLE FOCAL LENGTH, filed on May 14, 1980 in the names of Alfred L. Johnson, Jr. and Victor A. Peckham.

2. U.S. patent application Ser. No. 149,756 entitled TUBULAR BEAM JOINT, filed on May 14, 1980 in the name of Alfred L. Johnson, Jr.

3. U.S. patent application Ser. No. 154,141 entitled SPACE FRAME, filed on May 29, 1980 in the name of Alfred L. Johnson, Jr.

FIELD OF THE INVENTION

The present invention relates to a system for concentrating electro-magnetic radiation, such as solar radiation or radiation in the television and radar frequency ranges. To concentrate the radiation, a plurality of reflectors are mounted on a common frame and aimed at an absorber of the concentrated radiation. The absorber is rigidly coupled to the frame by an intermediate support. The combined frame, reflectors, absorber and intermediate support are suspended from a cantilever beam coupled to a main support. This suspension allows the combined frame, reflectors, absorber and intermediate support to pivot relative to the cantilever beam about two perpendicular axes.

BACKGROUND OF THE INVENTION

Extensive work has been done in the past in the field of concentrating electro-magnetic radiation, especially in harnessing the solar radiation from the sun. Most of these prior art devices have not met with mass appeal or production because they are very expensive, in terms of labor and materials, to manufacture, erect and maintain.

Manufacture of such solar radiation systems is expensive usually because of the massive support structures necessary to support heavy reflectors formed, for example, from glass or polished metal, heavy bearings and motors to adjust the reflectors to the daily and seasonal variation of the sun, and the detailed machining of the parts forming the structure.

Erection of such prior art solar radiation systems is expensive usually due to the complicated and massive supporting foundations for the structure.

Maintenance is expensive in lubricating many of the moving parts, tightening or otherwise adjusting the structure to maintain the reflectors in focus, replacing broken glass reflectors and polishing metallic ones. In addition, due to the exposure to the elements, including rain and wind, the overall structure must be constantly checked for potential damage due to the stress of wind and water.

In addition, because such prior art devices are usually massive, the motors utilized to adjust the reflectors to the proper attitude with regard to the sun utilize significant amounts of energy. Thus, the overall efficiency of such a solar system is diminished. Moreover, when numerous and massive parts are utilized to form the solar radiation system, the mere manufacture of these parts requires significant energy.

Prior art devices regarding radiation reflectors by themselves are disclosed in U.S. Pat. Nos. 2,952,189, issued to Pajes on Sept. 13, 1960; 4,033,676, issued to Brantley, Jr. et al, on July 5, 1977; and 4,046,462, issued to Fletcher et al, on Sept. 6, 1977. In addition, a variable focal length reflector is disclosed in the article entitled "Variable Focal Length Mirrors", *Review of Scientic Instruments*, Volume 32, No. 2, February, 1961, pages 210–211, by J. C. Muirhead.

Various structures in the prior art which could be used to form frames and joints therefor to support reflectors are disclosed in the following patents: U.S. Pat. Nos. 2,658,776, issued to Wilcox on Nov. 10, 1953; 2,964,147, issued to Fentiman on Dec. 13, 1960; 2,976,968, issued to Fentiman on Mar. 26, 1961; 3,270,478, issued to Attiwood on Sept. 6, 1966; 3,309,121, issued to Fentiman on Mar. 14, 1967; 3,323,820, issued to Braccini on June 6, 1967; 3,443,348, issued to Papayoti on May 13, 1969; 3,485,005, issued to Kutchai on Dec. 23, 1969; 3,914,063, issued to Papayoti on Oct. 21, 1975; 3,918,233, issued to Simpson on Nov. 11, 1975; 4,183,190, issued to Bance on Jan. 15, 1980; and 4,211,044, issued to Gugliotta et al on July 8, 1980. In addition, such prior art structures are disclosed in French Pat. No. 682,854, issued to Doornbos et al on June 3, 1930; Italian Pat. No. 581,277, issued to Industria Officine Magilana on Aug. 25, 1958; and German Offenlegungsschrift No. 2,444,612, issued to Arab on Apr. 1, 1976.

In addition, prior art solar radiation utilizing combined systems are disclosed in the following patents: U.S. Pat. Nos. 514,669, issued to Allingham on Feb. 13, 1894; 811,274, issued to Carter on Jan. 30, 1906; 2,760,482, issued to Tarcici on Aug. 28, 1956; 2,770,230, issued to Tarcici on Nov. 13, 1956; 2,798,478, issued to Tarcici on July 9, 1957; 2,987,961, issued to Cotton et al on June 13, 1961; 3,009,391, issued to Zagieboylo et al on Nov. 21, 1961; 3,171,403, issued to Drescher on Mar. 2, 1965; 3,200,820, issued to Garrett on Aug. 17, 1965; 3,364,676, issued to Miller on Jan. 23, 1968; 3,884,217, issued to Wartes on May 20, 1975; 3,977,773, issued to Hubbard on Aug. 31, 1976; 3,993,528, issued to Pauly on Nov. 23, 1976; 4,010,614, issued to Arthur on Mar. 8, 1977; 4,110,009, issued to Bunch on Aug. 29, 1978; 4,110,010, issued to Hilton on Aug. 29, 1978; 4,126,123, issued to Hall on Nov. 21, 1978; 4,129,360, issued to Deflandre et al on Dec. 12, 1978; 4,170,985, issued to Authier on Oct. 16, 1979 and 4,211,211 issued to Toomey et al on July 8, 1980. In addition, there is German Offenlegungsschrift No. 2,643,539, issued to Kleinwachter on Sept. 28, 1976.

SUMMARY OF THE INVENTION

Accordingly, a primary object of the present invention is to provide an electro-magnetic radiation reflective concentrator that is cheap and energy efficient to manufacture, erect, maintain and use.

Another object of the present invention is to provide such a concentrator which is very light in weight and can be suspended by merely a single cantilever beam supported by merely a single foundation.

Another object of the present invention is to provide such a concentrator which balances the frame, radiation absorber, reflectors and the interconnecting supports therefor so that small motors and little electrical energy is required to orient the reflectors relative to, for example, the sun.

Another object of the present invention is to provide such a concentrator with a very light open lattice frame for a plurality of reflectors, which reflectors are formed from light material such as plastic.

Another object of the present invention is to provide such a concentrator which is highly resistant to wind and water damage.

The foregoing objects are basically attained by providing an electro-magnetic radiation reflective concentrator comprising a main support; a cantilever beam coupled to the main support; a rigid frame; a absorber of electro-magnetic radiation; an intermediate support rigidly interconnecting the frame and the absorber; a plurality of electro-magnetic radiation reflectors coupled to the frame and aimed at the absorber; and means for suspending the frame, reflectors, absorber and intermediate support from the cantilever beam, this means being located between the reflectors and the absorber.

Advantageously, the suspension assembly supports the frame, reflectors, absorber and intermediate support from the cantilever beam substantially at the center of gravity of these four combined elements. Thus, the entire optical system including the target, i.e., the absorber, are balanced so that small bearings and motors can be used to orient the reflectors relative to the sun.

The frame, the cantilever beam, the intermediate support and the suspension assembly are formed from thin tubular members, which are cheap to manufacture, are easy to assemble and are light. Advantageously, the reflectors are formed from plastic material and can be placed in the proper curved configuration by creating a partial vacuum between each reflector and its associated housing. The entire system can be supported by coupling the cantilever beam to a single foundation, which provides cheap and quick construction in the field. Moreover, in such a fashion, the frame carrying the reflectors is located very low to the ground, or in some cases, in a pit formed in the ground, so it is less prone to wind damage.

Other objects, advantages and salient features of the present invention will become apparent from the following detailed description, which, taken in conjunction with the annexed drawings, discloses a preferred embodiment of the present invention.

DRAWINGS

Referring now to the drawings which form a part of this original disclosure:

SUMMARY OF OPERATION

Figure 1:
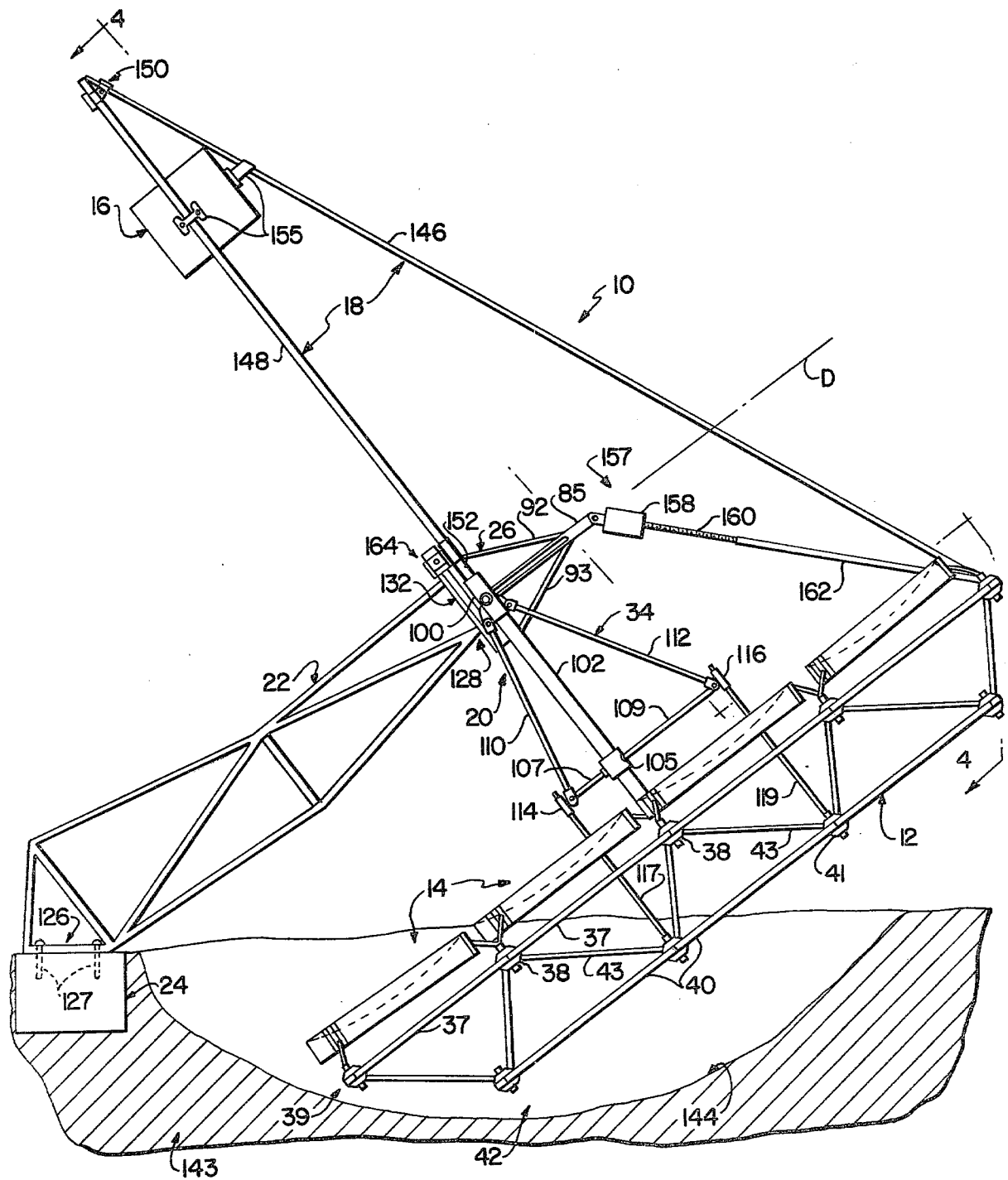
FIG. 1 is a side elevational view of the concentrator in accordance with the present invention.
Figure 2:
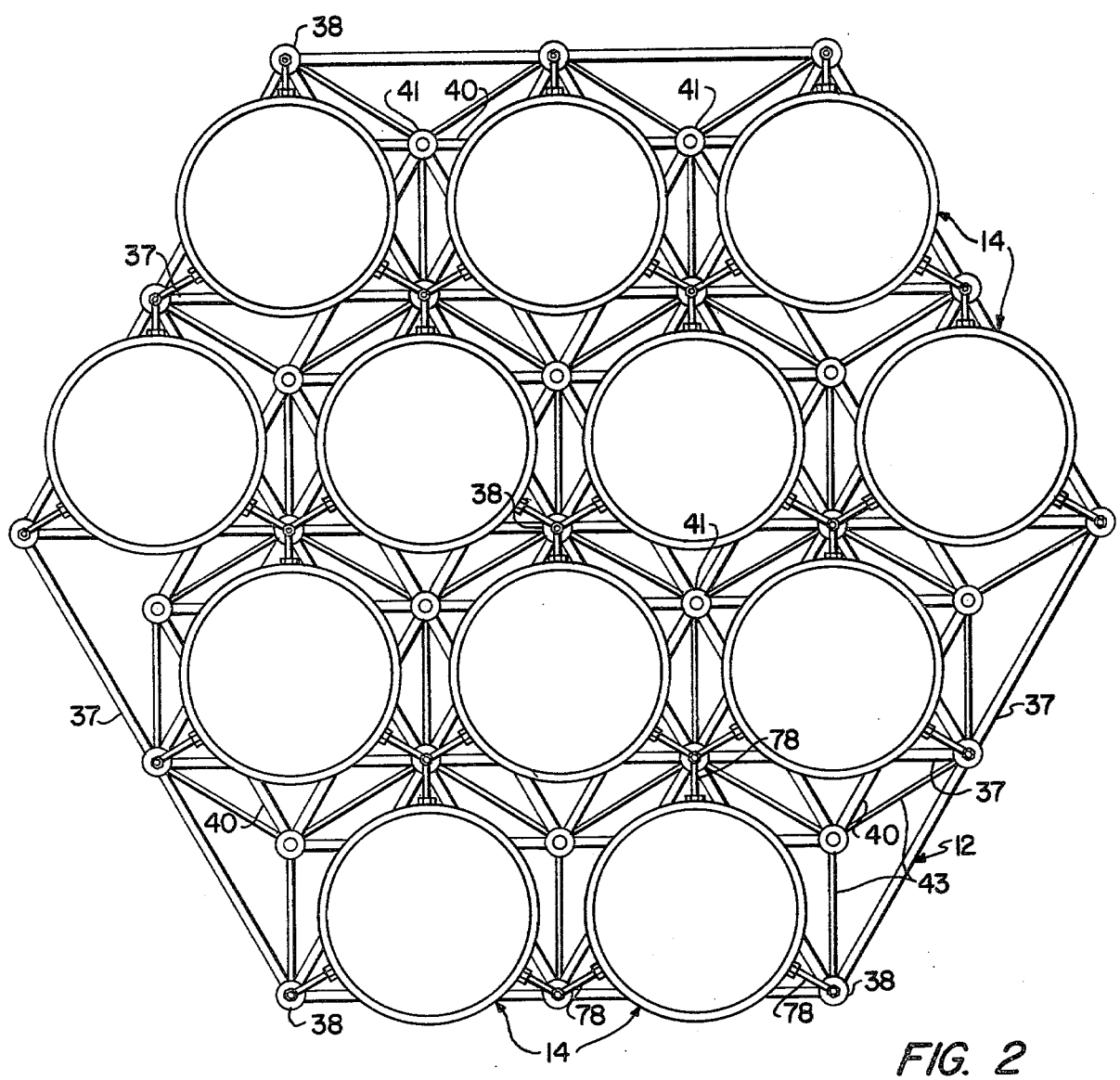
FIG. 2 is a top plan view of the frame and a plurality of curved reflectors coupled thereto in accordance with the present invention, with details of the suspension assembly deleted for clarity.

As seen in FIGS. 1–4, the electro-magnetic radiation reflective concentrator 10 of the present invention is comprised of a frame 12, a plurality of curved radiation reflectors 14 coupled to the frame, an absorber for the radiation 16, an intermediate support 18 rigidly interconnecting the absorber and the frame, a suspension assembly 20 for suspending as a unit the combined frame, reflectors, absorber and intermediate support from a cantilever beam 22, and a main support 24 supporting the cantilever beam.

The purpose of this structural system is to concentrate electro-magnetic radiation, such as solar radiation, on the absorber 16 by means of reflecting the radiation and aiming such reflected radiation by means of the reflectors 14. These reflectors 14 are rigidly coupled to the frame 12 and the absorber 16 is rigidly coupled to the frame by means of the intermediate support 18. Thus, the combination of the frame 12, reflectors 14, absorber 16 and intermediate support 18 form a rigid structure and therefore move as a unit. The plurality of reflectors are curved and are capable of varying their focal length so the reflected radiation can be focused on the absorber 16 and in addition the reflectors 14 can be adjusted relative to the frame 12 to aim the reflected radiation at the absorber 16.

Figure 4:
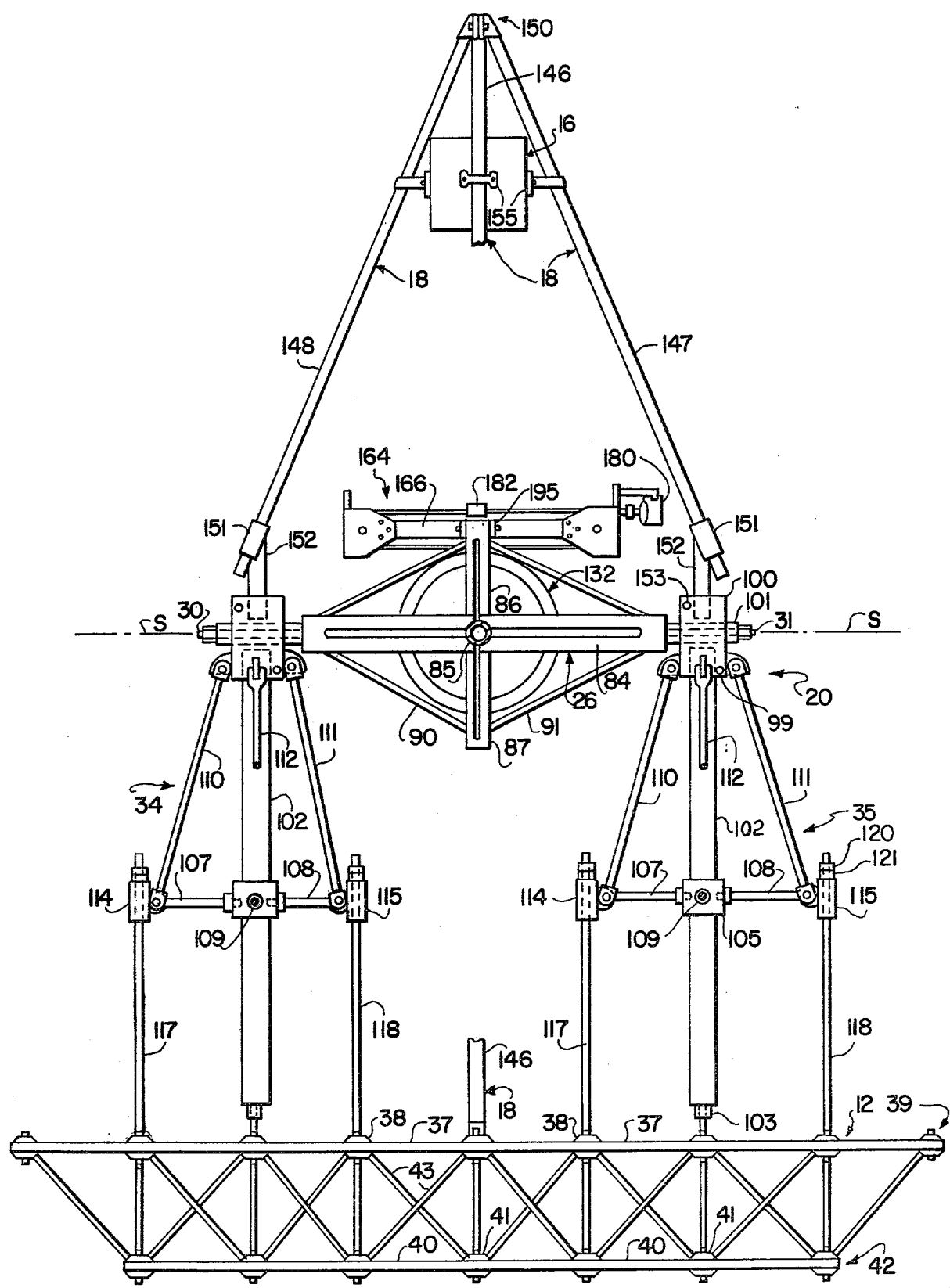
FIG. 4 is a sectional view of the concentrator shown in FIG. 1 taken along lines 4—4 with the details of the reflectors and the cantilever beam deleted for clarity.

In order to take into account a source of electro-magnetic radiation which has relative movement compared to the reflectors 14, such as the sun's daily cycle and seasonal cycle, the combined frame, reflectors, absorber and intermediate support are suspended by means of the suspension assembly 20 to the cantilever beam 22 for pivotal movement about a first axis D, seen in FIG. 1, and a second axis S, seen in FIG. 4, these axes being perpendicular. To take into account, for example, the sun's daily cycle, the combined unit of the frame, reflectors, absorber and intermediate support are mounted for pivotal movement about axis D. To take into account, for example, the seasonal cycle of the sun, this combined unit is also pivotally suspended for pivotal movement about axis S.

The manner of accomplishing these pivotal movements is diagramatically shown in FIGS. 6–9. As seen therein, the suspension assembly 20 is comprised of a central carriage 26 pivotally coupled to the cantilever beam 22 by means of a shaft 28, the central carriage 26 having two additional shafts 30 and 31 coupled at opposite ends thereof which are pivotally coupled, respectively, to a first and second lower mast assemblies 34 and 35. These mast assemblies are rigidly coupled at their ends to the frame 12. These structural relationships are also shown in more detail in FIGS. 1, 4, 5, 13, 14 and 15.

Thus, to take into account the daily movement of the sun, the combined frame 12, reflectors 14, absorber 16 and intermediate support 18 pivot about shaft 28 which is along the first axis D.

To take into account seasonal movement of the sun, the frame 12, reflectors 14, absorber 16 and intermediate support 18 pivot about shafts 30 and 31, which are along the second axis S, since the frame 12 is rigidly coupled to the lower mast assemblies 34 and 35 which are in turn pivotally coupled to shafts 30 and 31.

Figure 7:
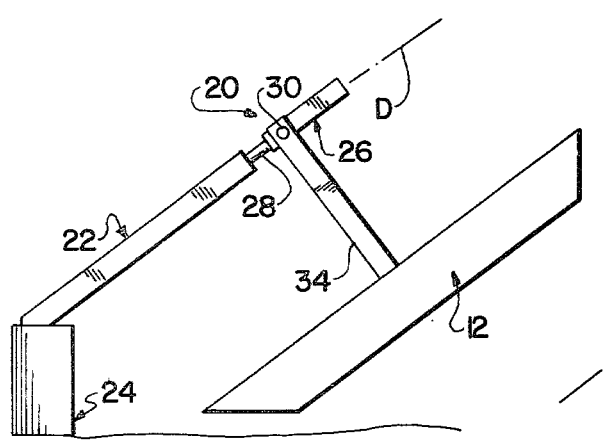
FIG. 7 is a diagramatic side view of the concentrator shown in FIG. 6.
Figure 8:
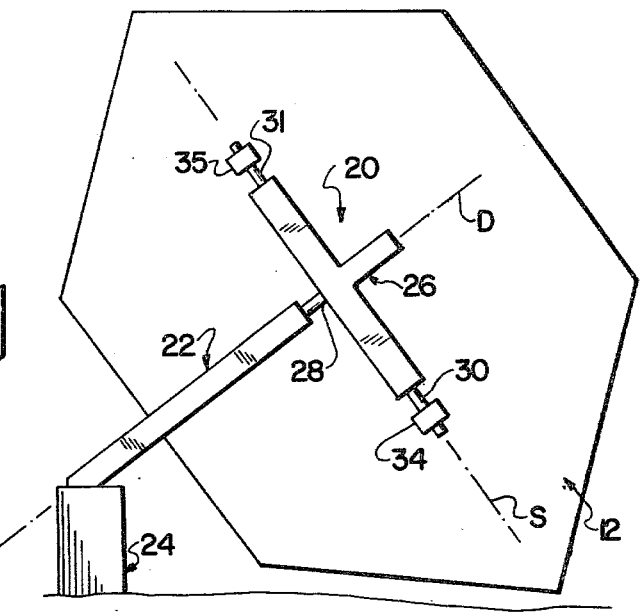
FIG. 8 is a diagramatic side view similar to that shown in FIG. 7 except that the suspension assembly and the attached frame have been pivoted about the first axis D.

The pivotal movement about the first axis D is seen when comparing FIGS. 7 and 8, FIG. 7 representing a typical position for reflecting noon time sun and FIG. 8 representing a typical position for reflecting early morning sun in a northern latitude.

Figure 9:
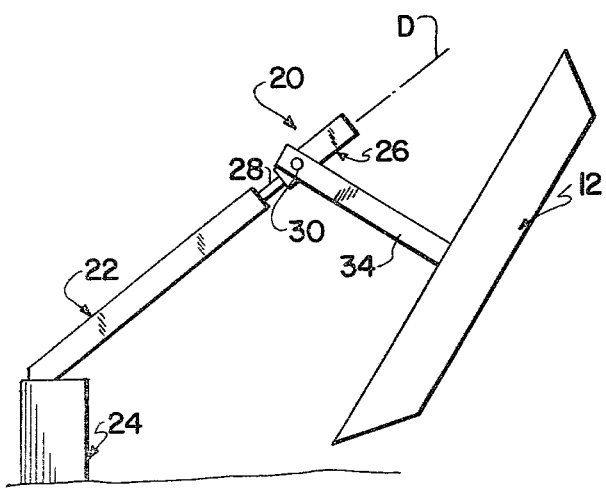
FIG. 9 is a diagramatic side view similar to that shown in FIG. 7 except that a portion of the suspension assembly and the frame have been pivoted relative to the cantilever beam about the second axis S.

In FIG. 9, the frame 12, and therefore the absorber, reflectors, intermediate support and lower mast assemblies coupled thereto, are pivoted about the second axis S to take into account the position of the sun that is lower during the winter time.

DETAILED DESCRIPTION OF THE PREFERRED EMBODIMENT

Set forth in detail hereinafter are the various elements making up the concentrator of the present invention and the manner in which they are coupled together.

Frame

The frame 12 is in the form of a open lattice space frame formed of a plurality of tubular beams 37 interconnected by a plurality of joints 38 in a first plane defining the upper surface 39 of the frame, a plurality of tubular beams 40 interconnected rigidly by a plurality of joints 41 in a second plane parallel to the first and forming a lower surface 42 of the frame, and a plurality of diagonal tubular struts 43 interconnecting the joints 38 and 41 in the two planes to form a rigid structure, as seen in FIGS. 1, 2, 4, 5, and 10–12. This structure is light in weight while being resistant to bending moments.

Figure 11:
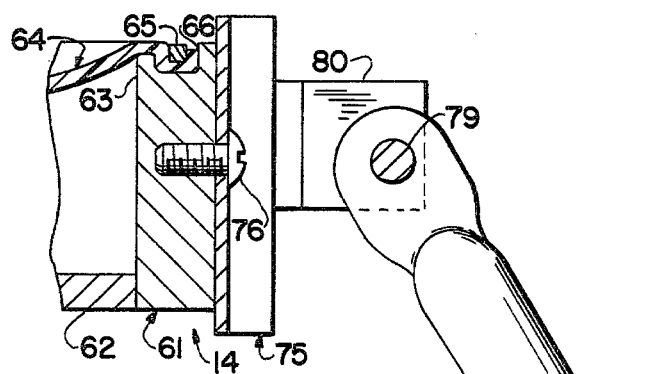
FIG. 11 is a sectional view taken along lines 11—11 in FIG. 10.
Figure 12:
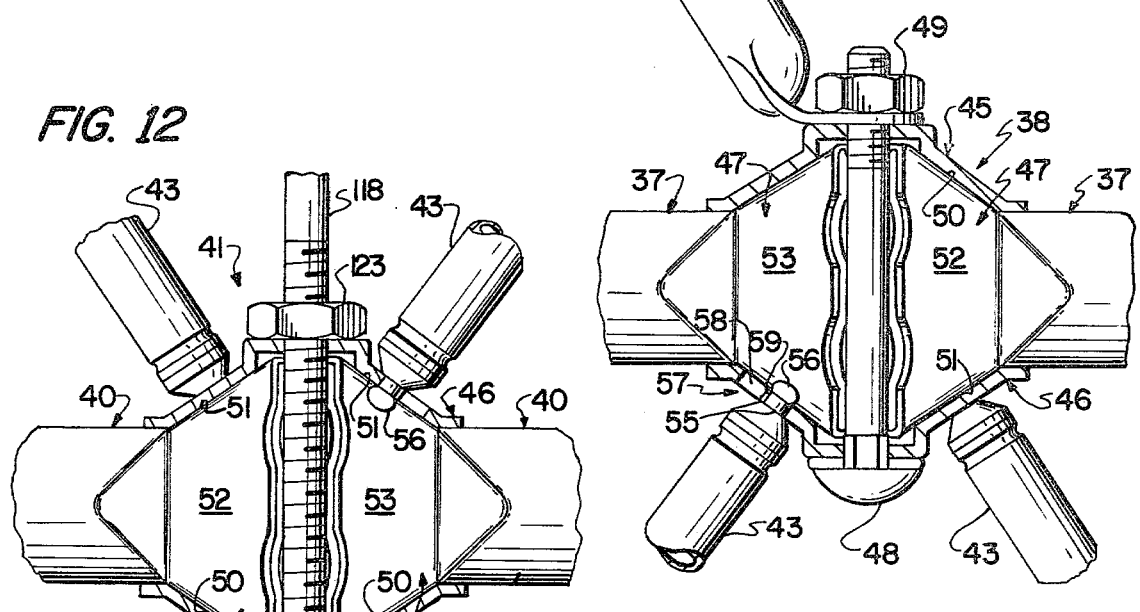
FIG. 12 is a longitudinal sectional view of a joint in the frame connecting six tubular beams, having diagonal struts extending therefrom and fastened by a threaded rod extending down from the lower mast assembly of the suspension assembly.
Figure 10:
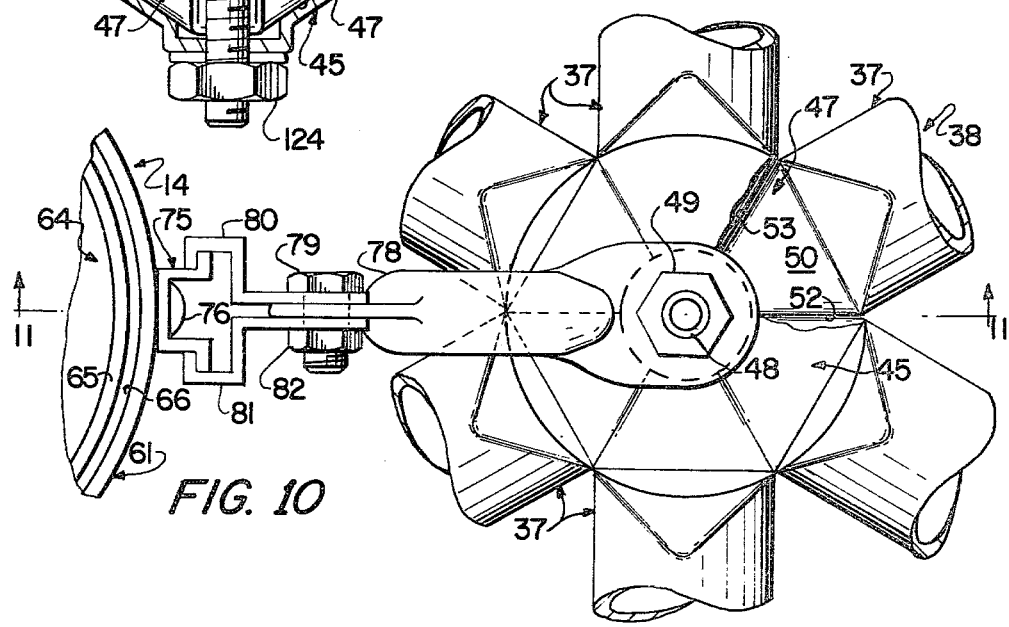
FIG. 10 is a top plan fragmentary view of a joint in the frame coupling six tubular beams and having a reflector support extending therefrom.

Referring now to FIGS. 10–12, joints 38 and 41 are essentially the same but are inverted, the joint 38 seen in FIG. 11 being representative of the joints in the upper surface 39 and the joint 41 seen in FIG. 12 being representative of the joints in the lower surface 42. Most of the joints in both surfaces receive six tubular beams, those that do not are the ones on the periphery of these two surfaces in which a spacer may be utilized to take up the absent remaining tubular beams. In addition, most of the joints 41 in the lower surface 42 merely have a bolt and nut to complete the joint while the joint 41 shown in FIG. 12 has a threaded rod which forms a part of the two lower mast assemblies 34 and 35 as will be described in more detail hereinafter.

As best seen in FIG. 11, each joint, both joints 38 and 41, are comprised of a first cap 45, a second cap 46, six end portions 47 integrally extending from the tubular beams, a bolt 48 and a nut 49.

The specific details of these joints and the space frame formed thereby with the tubular beams and diagonal struts are disclosed in the applications referred to above entitled TUBULAR BEAM JOINT and SPACE FRAME.

For the purposes of the present application, it is seen in FIGS. 10–12 that the first and second caps 45 and 46 are substantially in the form of six-sided frustums which clamp the end portions 47 therebetween and fastened by bolt 48 and nut 49. Each end portion 47 is integral with the remaining portion of the tubular beam, either 37 or 40 and comprises two opposed substantially planar and trapezoidal outwardly diverging faces 50 and 51 in contact with caps 45 and 46 respectively, and two substantially planar trapezoidal opposed inwardly converging faces 52 and 53 contacting respectively the adjacent faces 53 and 52 of the two next adjacent end portions 47 of the other tubular beams captured between the caps 45 and 46. Preferably, these end portions 47 are stretched during formation so that their outer perimeter is greater than the outer perimeter of the remaining portion of the tubular beam so it is quite difficult to pull each beam from the joint. As best seen in FIG. 10, preferably the converging faces 52 and 53 are at an angle of about 60° so that the end portions 47 form a contacting array fully including 360° in each joint which is in the interior of the two surfaces 39 and 42. The angle of the outwardly diverging faces 50 and 51 are substantially equal to the angle of taper of each substantially frustum-shaped cap.

As seen in FIGS. 11 and 12, each of the diagonal tubular struts 43 has a short shaft 55 at the end thereof extending along the longitudinal axis of each strut with an enlarged end 56. Each of the caps 46, both in the upper surface 39 and the lower surface 42 have three apertures spaced 120° for the reception of each shaft 55 associated with each strut 43.

As seen in FIG. 11, each aperture 47 has a circular portion 58, which can receive the enlarged end 56 therein, communicating with an elongated portion 59 which receives the shaft 55 therein but is smaller than the enlarged end 56 so that once the shaft is received therein it and the strut 43 cannot be pulled therefrom.

Reflectors

As seen in FIGS. 1, 2, 3, 10 and 11, a plurality of reflectors of electro-magnetic radiation are coupled to the upper surface 39 of the frame 12. The specific details of these reflectors are disclosed in the application referred to above entitled CURVED REFLECTOR WITH ADJUSTABLE FOCAL LENGTH.

Figure 3:
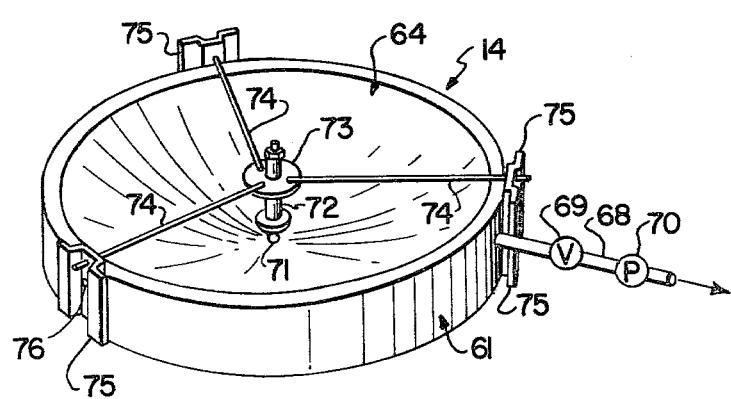
FIG. 3 is a perspective view of a reflector utilized with the present invention.

For the purposes of this application, as seen in FIGS. 3, 10 and 11, each reflector comprises a cylindrical housing 61 having a closed end 62 and an opening 63 with a reflective membrane 64 stretched across the opening and secured to the housing in a gas-tight manner by means of a ring 65 received in a groove 66 in the top of the housing with a peripheral portion of the membrane interposed therebetween. The ring 65 can be suitably fastened to the housing to be sure the membrane stays connected in a gas-tight manner. Advantageously, the reflective membrane 64 is formed from an elastic, flexible piece of material such as Mylar which has an aluminized reflective surface.

Initially, the membrane 64 is in a substantially flat configuration, however, it is caused to assume a curved configuration extending inwardly into the housing 61 by means of a partial vacuum formed within the housing 61 by means of a fluid line 68 extending into the interior of the housing and having a restrictor valve 69 therein and a vacuum forming pump 70 coupled thereto. Each of the individual reflectors 14 seen in FIG. 2 can be coupled merely to one pump 70.

In order to adjust the focal length of each curved reflector 14, each membrane 64 has a central aperture 71 therein, as seen in FIG. 3, with a screw 72 suspended above the aperture in an inverted position by means of a threaded support 73 coupled to the housing 61 by means of three spokes 74 coupled to three brackets 75 fastened to the housing 61 by means of screws 76, as also seen in FIGS. 10 and 11. The further the head of the screw 72 is rotated into the housing 61, the more curvature the membrane 64 will assume because of the partial vacuum formed beneath the elastic, flexible membrane.

In order to aim each of the individual reflectors 14 towards the absorber 16, each reflector is adjustably supported in three areas to three joints 38 in the upper surface of the frame 12, as seen in FIGS. 10 and 11. Thus, a short tube 78 is crushed at each end, flattened and bored, with these ends lying in perpendicular planes. One end has the bore receiving bolt 48 from one of the joints 38 and fastened with nut 49, while the other end has its bore receiving a bolt 79 and attaching suitably bored opposed clamps 80 and 81 thereto with nut 82. These opposed clamps 80 and 81 receive L-shaped portions of the bracket 75 yet allow each bracket 75 to be adjusted vertically, as seen in FIG. 11, relative to the clamps 80 and 81. Thus, each reflector 14 is individually suspended at three points via the three brackets 75 so that it can be aimed at the absorber 16.

Suspension Assembly

As seen in FIGS. 1, 4, 5, 13, 14 and 15, the suspension assembly 20 is comprised of a central carriage 26 and the first and second lower mast assemblies 34 and 35. This suspension assembly hangs the combined frame, absorber, reflectors and intermediate support from the cantilever beam so they are free on all sides except at the point of support.

The carriage 26 comprises a main tube 84, a support tube 85 received in a transverse set of bores in the main tube and welded thereto, and upper and lower square tubes 86 and 87 welded on opposite sides of the main tube 84, and being perpendicular to the main tube as well as the support tube.

Diagonal struts 88 and 89 are welded respectively to the upper square tube 86 and opposite ends of the main tube 84; and struts 90 and 91 are welded respectively to the lower square tube 87 and the opposite ends of the main tube 84. Similarly, strut 92 is welded between the upper square tube 86 and the support tube 85 and strut 93 is welded between the lower square tube 87 and the support tube 85. In addition, strut 94 is welded between support tube 85 and main tube 84 and strut 95 is welded between support tube 85 and main tube 84.

Figure 15:
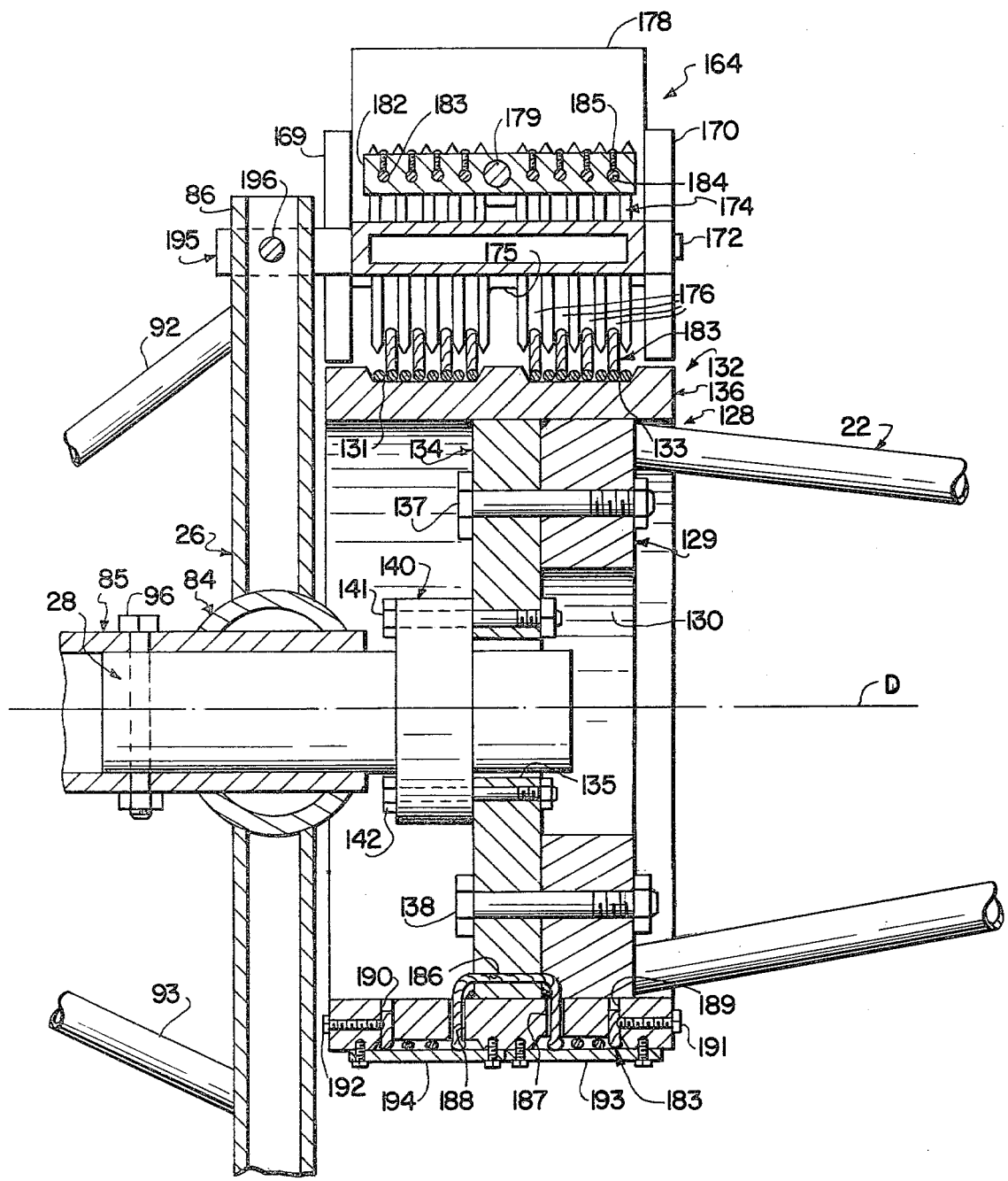
FIG. 15 is an enlarged fragmentary sectional view taken along lines 15—15 in FIG. 13.

As seen in FIG. 15, the support tube 85 receives shaft 28 therein and is rigidly coupled thereto by means, for example, of bolt 96 for pivotal movement therewith. Since shaft 28 is pivotally coupled, ultimately, to the cantilever beam 22, the carriage 26 and the connected frame 12, reflectors 14, absorber 16 and intermediate support 18 can pivot relative to the cantilever beam 22 along the first axis D which extends along the longitudinal axis of shaft 28.

Figure 5:
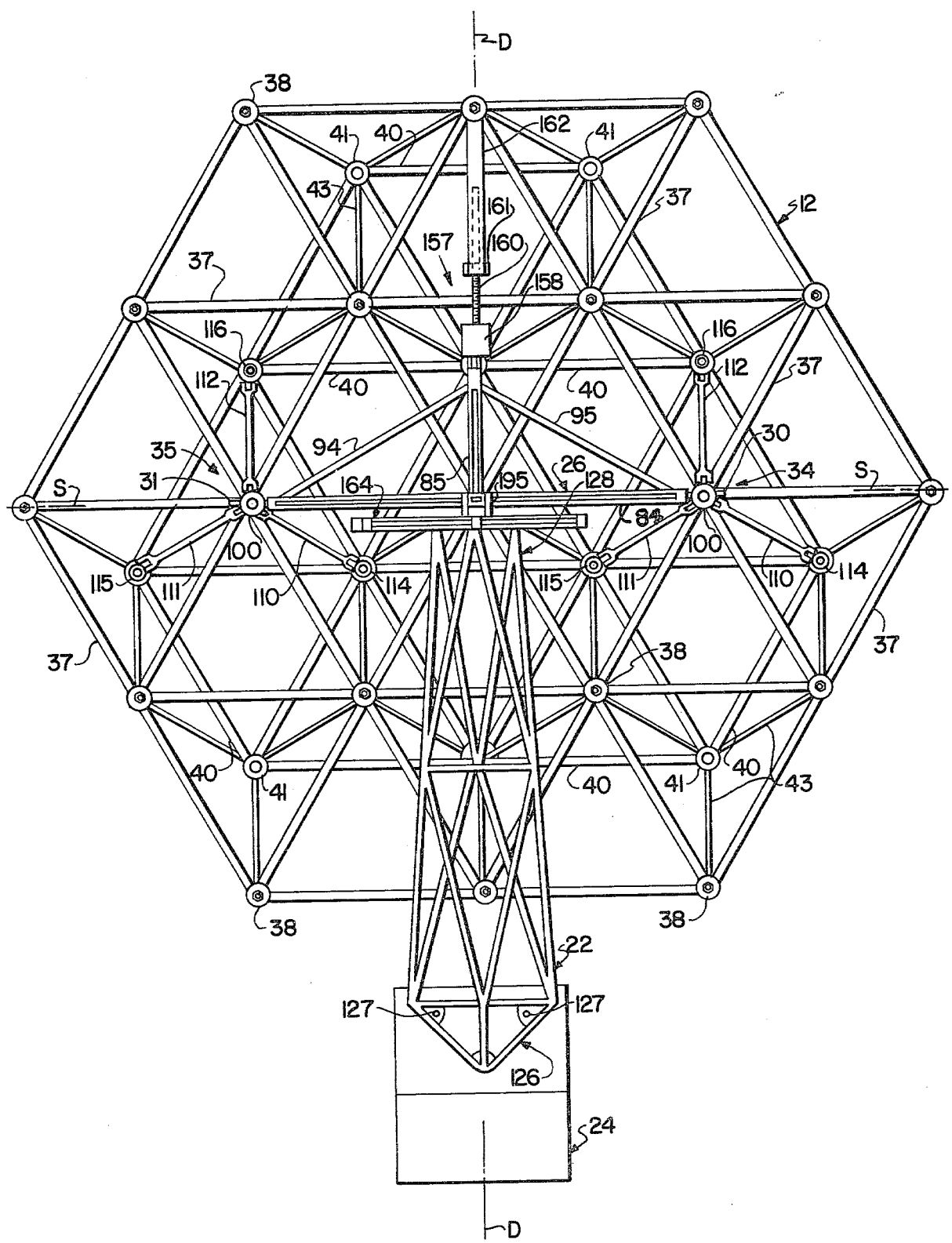
FIG. 5 is a top view looking directly at the upper surface of the frame in accordance with the present invention showing the frame, the suspension assembly, the cantilever beam and the main support with the reflectors removed for clarity.
Figure 6:
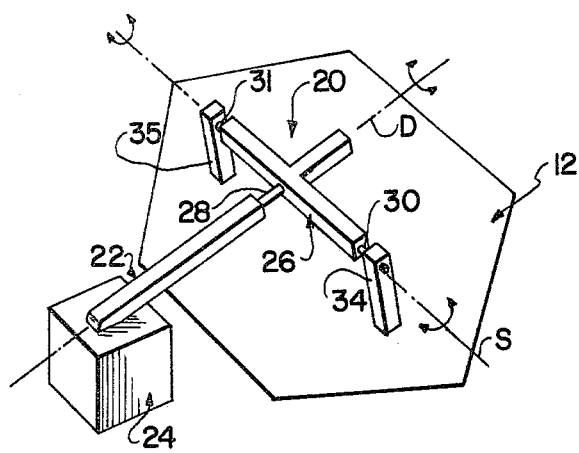
FIG. 6 is a diagramatic perspective view showing how the suspension assembly couples the frame to the cantilever beam for pivotal movement about first and second perpendicular axes designated D and S.

Each of the lower mast assemblies 34 and 35, seen in FIGS. 1, 4 and 5, are the same with lower mast assembly 34 being pivotally coupled to shaft 30 rigidly extending from one end of main tube 84 and the second lower mast assembly 35 being pivotally coupled along shaft 31 extending from the other end of main tube 84.

As seen in FIGS. 1, 4 and 5 each lower mast assembly comprises a tubular hub 100 having a transverse tube 101 received in two opposed transverse bores and welded thereto, and a tubular mast 102 received in the bottom of the hollow hub, the top of the tubular mast abutting the transverse tube 101. A pin 99 passes through aligned bores in hub 100 and tube 101 to attach these two elements. The transverse tube 101 pivotally receives shaft 31 extending from main tube 84 and is suitably fastened by means of a nut or a cotter pin.

At the bottom of the tubular mast 102, the interior is threaded to threadedly receive a threaded stud 103 which is in turn internally threaded to receive the threaded end of a bolt 48 extending from one of the joints 38 in the upper surface 39 of the frame 14.

The tubular mast 102 has rigidly received thereon a tube 105 having three equally spaced circumferential blind bores for the reception of three pins at the ends of three spreaders 107, 108 and 109. Each spreader near its distal end is coupled to the hub 100 by means of three rods 110, 111 and 112 with a clevis connection respectively to a bore in each spreader and a bore in three flanges extending from the hub 100.

At the end of each spreader, tubes 114, 115 and 116 are respectively rigidly coupled, each of these tubes respectively receiving rods 117, 118 and 119, which are threaded at opposite ends. The top ends have a pair of nuts 120 and 121 threaded thereon, for example, as seen in FIG. 4 regarding rod 118, that rod at the other end being received in and forming part of the frame joint 41, as seen in FIG. 12. Rod 118 is secured to that joint by means of two opposed nuts 123 and 124. Each of the other rods associated with both lower mast assemblies 34 and 35 are similarly connected to a joint 41 in the lower surface 42 of the frame 12, as best seen in FIG. 1.

By so forming the lower mast assemblies 34 and 35, each mast 102 is kept in compression by means of the tension afforded by rods 110–112 and 117–119 between the frame 12 and each hub 110 and the coupled carriage 26.

As seen in FIG. 4, the frame 12 is thus rigidly supported to the lower mast assemblies which are in turn pivotally coupled to the carriage 26 along shafts 30 and 31 which define the second pivotal axis S. Although the suspension assembly is between the absorber and the reflectors, and therefore casts a shadow on the absorber, radiation from the reflectors is sufficient to heat the absorber to desired temperatures. Forming the assembly of thin beams as an open lattice reduces this shadow effect.

Cantilever Beam

As seen in FIGS. 1, 5, 14 and 15, the cantilever beam 22 is formed as an open lattice from a plurality of tubular beams coupled together such as by welding. Since a certain portion of the cantilever beam, as seen in FIGS. 1 and 5, is located between the reflectors 14 and the absorber 16, it is advantageous to form the beam as an open lattice to reduce the shadow formed thereby as the radiation is reflected from the reflectors towards the absorber.

As seen in FIGS. 1 and 5, the base 126 of the cantilever beam 122 receives a plurality of bolts 127 which are received in the main support 24 to rigidly secure the beam to the main support.

As best seen in FIG. 15, the distal end 128 of the cantilever beam includes a circular plate 129 welded to the beams forming the overall cantilever beam, the plate having a central bore 130. This plate 129 is rigidly coupled to a drum 132, which is formed from a circular hub 134 having a central bore 135 and an annular rim 136 welded on its inside to the outer periphery of the hub 134. The circular plate 129 is rigidly fastened to the hub 134 by means of suitable fasteners such as bolts 137 and 138, via suitable bores formed in hub 134 and plate 129.

As seen in FIG. 15, the shaft 28 rigidly coupled to the carriage 26 via a rigid connection with support tube 85 is pivotally coupled to the drum 132, and therefore the cantilever beam 22, by means of a bearing 140 rotatably supporting the shaft 28 and rigidly coupled to the hub 134 of the drum 132 by means of bolts 141 and 142 received in suitable bores in the bearing 140 and hub 134. A portion of the shaft 28 extends through the central bore 135 in the hub 134.

Main Support

As seen in FIGS. 1, 5 and 6–9, the main support 24 is advantageously a block of rigid structural material such as concrete or cinder blocks, which rigidly receive bolts 127 from the cantilever beam 22.

As seen in FIG. 1, the main support 24 can be imbedded in the ground with a portion of the frame 12 received in a pit 144 formed adjacent thereto. This is highly advantageous since the reflectors 14 are located near and below ground level, thereby protecting them from potential wind damage.

The main support 24 can also be coupled to a building structure or eliminated and the beam 22 directly coupled to a building structure, as long as the bottom of the frame 12, as seen in FIG. 1, is free.

Intermediate Support

The intermediate support, rigidly interconnecting the absorber 16 and the frame 12, comprises an upper mast 146 and two side masts 147 and 148, the distal ends of these three masts being rigidly coupled together by a suitable clamp 150, as seen in FIGS. 1 and 4.

The upper mast 146 is preferably a rigid tube coupled to the frame 12 at a central joint 38 at the top of the frame 12 as seen in FIG. 1. Depending on the weight of the absorber 16, the upper mast 146 can be replaced by a cable or eliminated.

Each of the side masts 147 and 148 is also formed of a rigid tube and, as seen in FIG. 4, has a short tube 151 welded coaxially to the outside thereof, which tube has a short support tube 152 welded thereto and extending into the bore in hub 100, being secured therein by means of a pin 153 passing through suitable bores in the hub and in the support tube 152. Additional cables can be used, if desired, to couple each of the side masts 147 and 148 to the frame 12. In addition, each of the side masts 147 and 148 can receive therein copper tubing, which is insulated, to transmit fluid, such as water, to and away from the absorber 16 which could be, for example, a boiler.

As is best seen in FIG. 4, the intermediate support includes not only the upper mast 146 and the two side masts 147 and 148, but also includes the two lower mast assemblies 34 and 35. If desired, an additional cable or cables can be coupled at the distal end of the masts 146, 147 and 148 near clamp 150 and coupled to the frame 12 to provided added rigidity.

Absorber

The absorber 16, seen in FIGS. 1 and 4, can be any suitable absorber of electro-magnetic radiation. This can include a boiler, a steam engine, a furnace, a photovoltaic cell, a sterling cycle engine, a television signal receiver or a radar receiver.

The absorber 16 is rigidly coupled to the intermediate support 18 by means of a series of suitable clamps 155 connecting the absorber with the masts 146–148.

Seasonal Variation Motive Assembly

Figure 14:
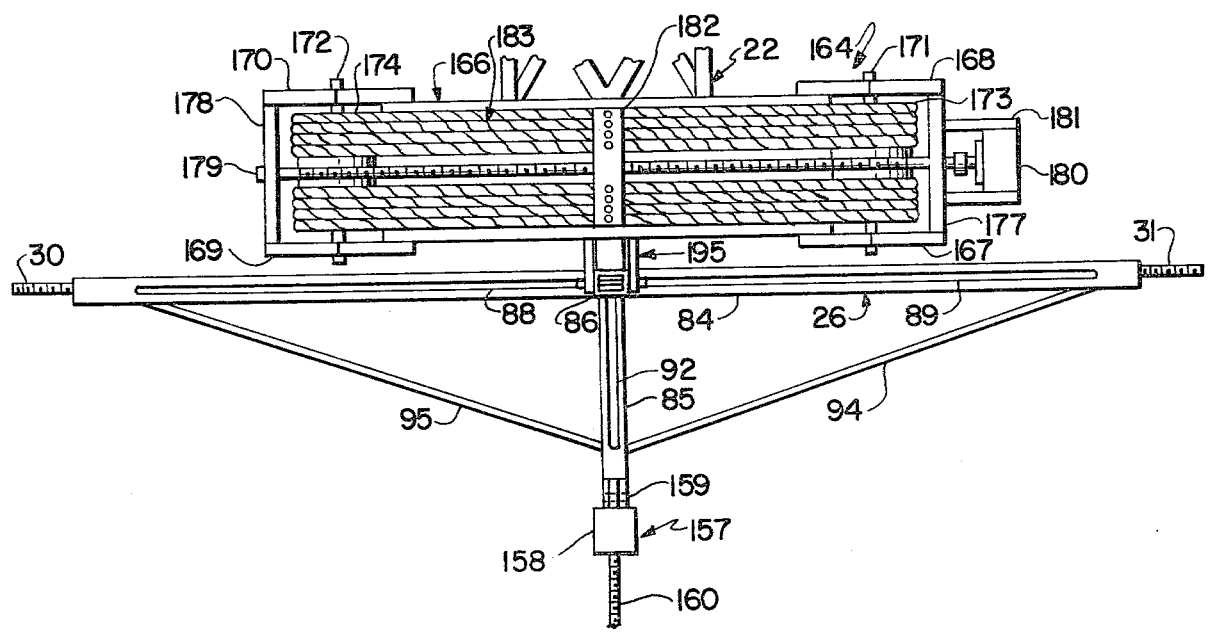
FIG. 14 is a top view of the structure shown in FIG. 13.

As seen in FIGS. 1, 5 and 14, a seasonal variation motive assembly 157 is provided to pivot the frame, absorber, reflectors and intermediate support about the second axis S. If the electro-magnetic radiation to be reflected were the sun's solar radiation, this motive assembly would take into account the change of the sun's location during seasonal cycles. If the electro-magnetic radiation were of a different source, the motive assembly 157 would take into account the required change in elevation of the reflectors to align them with the source of the radiation.

The motive assembly 157 comprises a reversible electric motor 158 having a pivotal coupling 158 with the distal end of the support tube 85 on carriage 26 and an elongated screw 160 extending therefrom and being rotated thereby.

As seen best in FIG. 5, the screw 160 is threadedly received in a bore in a block 161, which block is in turn rigidly received in a channel beam 162 which is coupled to the frame, for example, to a joint 38 in the upper surface of the frame. The precise location of the channel beam's connection to the frame is not critical as long as it is in a position to pivot the frame relative to the second axis S under the influence of motor 158.

Daily Variation Motive Assembly

To take into account the daily cycle of the sun, if the electro-magnetic radiation for the concentrator 10 were solar radiation, or to take into account the azimuthal variation of the radiation source, a motive assembly 164 is provided to pivot the frame, reflectors, absorber and intermediate support about the first axis D, and therefore about shaft 28.

Figure 13:
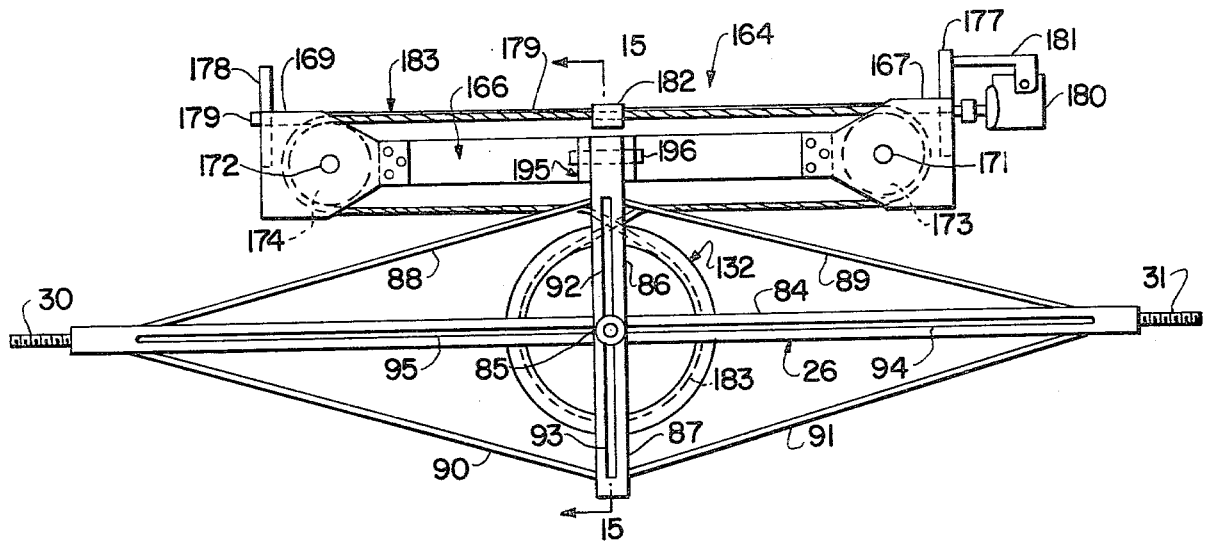
FIG. 13 is a elevational view of a part of the suspension assembly showing the carriage, the drum and the motive assembly for pivoting the combined frame, reflectors, absorber and intermediate support about the first axis D.

The motive assembly 164 is generally seen in FIGS. 1, 4 and 5, but more specifically shown in FIGS. 13–15.

To understand the action of the motive assembly 164, it is crucial to realize that the assembly 164 is rigidly coupled to the upper square tube 86 of carriage 26 and the motive assembly 164 travels around the outer periphery of drum 132 which is rigidly coupled to the cantilever beam 22. This is accomplished by a single cable connected to the motive assembly 164 and wrapped around the rim 136 of the drum, the motive assembly 164 walking around the drum.

Thus, the motive assembly 164 comprises a support bar 166 having four pulley gussets 167–170 rigidly coupled at the four corners of the bar 166, these gussets receiving two pulley shafts 171 and 172 for rotatably supporting, respectively, two pulleys 173 and 174.

As seen in FIG. 15, each pulley has a central deep groove 175 and two sets of four smaller grooves 176 on each side of the central groove 175.

Two mounting plates 177 and 178 are rigidly coupled between pulley gussets 167 and 168 on the one hand and 169 and 170 on the other having central apertures and suitable bearings for supporting a screw 179 extending longitudinally of the support bar 166 and thereabove, as seen in FIGS. 13-15.

Screw 179 is rigidly coupled to an electrical motor 180, the motor being supported by a suitable bracket 181 to mounting plate 177. The screw 179 is threadedly engaged in a threaded aperture in a travelling block 182, as best seen in FIG. 15.

A single length of cable 183 is wrapped around the rim 136 of drum 132 in grooves 131 and 133 and is then received around the two pulleys 173 and 174 in grooves 176 in a "figure eight" configuration. The cable also passes through eight bores 184 in the travelling block 182 and is rigidly secured thereto by means of set screws 185.

Thus, when screw 179 is rotated by motor 180, it moves the travelling block 182 longitudinally thereof which also pulls the cable 183 received therein.

As seen in FIG. 15, the cable 183 has its center received in a transverse bore 186 in hub 134 of drum 132 and extends outwardly through two bores 187 and 188 in the rim 136, the two ends of the cable 183 after its complete wrapping around the drum and the pulleys, are received respectively in bores 189 and 190 adjacent bores 187 and 188, these ends being secured by set screws 191 and 192 in suitable bores in the sides of the rim 136. Two clamping bars 193 and 194 are suitably bolted to the outer periphery of rim 136 to secure the cable 183 to the drum so there is no relative movement therebetween. Additional clamping of the ends of the cable 183 can be provided so as to assure that the cable will not slip relative to the drum.

Thus, with the cable being wrapped around the drum and around the two pulleys, rotation of screw 179 will move the travelling block 182 longitudinally thereof resulting in a pulling action on the cable coupled to the travelling block 182.

Since the cable is rigidly secured to the drum, the entire motive assembly 164 will walk around the drum 132.

As seen in FIGS. 4, 5, 13, 14 and 15, a bracket 195 rigidly extends from the support bar 166 and is rigidly coupled to the upper square tube 86 by means of a rod 196 passing through suitable apertures in the bracket and in the tube.

Thus, when the motive assembly 164 walks around the drum 132, it will carry the carriage 26 therewith, pivoting the carriage about shaft 28 which is the first pivotal axis D. Since the carriage 26 is coupled via the lower mast assemblies to the frame 12, such pivotal movement will be translated into pivotal movement of the frame. Since the frame carries the reflectors 14 and the intermediate support 18 as well as the absorber 16, such pivotal movement also pivots these structural elements. Preferably, the electrical motor 180 is reversible so that the carriage 26 is capable of pivotal movement in two directions around the first axis D.

While a preferred embodiment has been chosen to illustrate the invention, it will be understood by those skilled in the art that various changes and modifications can be made therein without departing from the scope of the invention as defined in the appended claims.

What is claimed is:

1. An electro-magnetic radiation reflective concentrator comprising:
    a main support;
    a cantilever beam coupled to said main support;
    a rigid frame;
    an absorber of electro-magnetic radiation;
    an intermediate support rigidly interconnecting said frame and said absorber;
    a plurality of electro-magnetic radiation reflectors coupled to said frame and aimed at said absorber; and
    means for suspending said frame, reflectors, absorber and intermediate support from said cantilever beam;
    said means being located between said reflectors and said absorber.

2. A concentrator according to claim 1, wherein said means suspends said frame, reflectors, absorber and intermediate support from said cantilever beam substantially at the center of gravity of the combined frame, reflectors, absorber and intermediate support.

3. A concentrator according to claim 1, wherein said means for suspending includes
    first means for pivotally coupling said frame, reflectors, absorber and intermediate support to said cantilever beams for pivotal movement about a first axis.

4. A concentrator according to claim 3, wherein said means for suspending includes
    second means for pivotally coupling said frame, reflectors, absorber and intermediate support to said cantilever beam for pivotal movement about a second axis which is perpendicular to the first axis.

5. A concentrator according to claim 4, and further comprising
    first motive means for pivoting said frame, reflectors, absorber and intermediate support about the first axis, and
    second motive means for pivoting said frame, reflectors, absorber and intermediate support about the second axis.

6. A concentrator according to claim 3, wherein said first means for pivotally coupling includes
    a rigid carriage pivotally coupled to said cantilever beam,
    a first rigid mast assembly coupled to said carriage and to said frame, and
    a second rigid mast assembly coupled to said carriage and to said frame.

7. A concentrator according to claim 4, wherein said second means for pivotally coupling includes
    a rigid carriage coupled to said cantilever beam,
    a first rigid mast assembly pivotally coupled to said carriage and rigidly coupled to said frame, and
    a second rigid mast assembly pivotally coupled to said carriage and rigidly coupled to said frame.

8. A concentrator according to claim 7, and further comprising
    motive means for pivoting said frame, reflectors, absorber and intermediate support about the second axis, said motive means being coupled to said carriage and to said frame.

9. A concentrator according to claim 6, and further comprising motive means for pivoting said frame, reflectors, absorber and intermediate support about the first axis, said motive means including a drum rigidly coupled to said cantilever beam and a driving assembly rigidly coupled to said carriage and coupled to said drum for movement about the periphery of said drum.

10. A concentrator according to claim 1, wherein said frame comprises a plurality of tubular beams interconnected by a plurality of joints.

11. A concentrator according to claim 1, wherein said reflectors are curved.

12. A concentrator according to claim 1, wherein said cantilever beam is formed as an open lattice of elongated members.

* * * * *